United States Patent [19]

Lee

[11] Patent Number: 5,500,078
[45] Date of Patent: Mar. 19, 1996

[54] 8-BEAM BRIDGE-TYPE SILICON ACCELERATION SENSOR AND THE FABRICATING METHOD THEREOF

[75] Inventor: Jong H. Lee, Taegu, Rep. of Korea

[73] Assignees: Kyung Pook National University Sensor Technology Research Center; Mando Machinery Corporation, both of Rep. of Korea

[21] Appl. No.: 371,272

[22] Filed: Dec. 23, 1994

[30] Foreign Application Priority Data

Dec. 24, 1993 [KR] Rep. of Korea .................. 1993-29498

[51] Int. Cl.⁶ .................................................. H01L 21/00
[52] U.S. Cl. .................................. 156/628.1; 156/657.1; 156/662.1; 216/2; 216/99; 73/514.34
[58] Field of Search ........................... 156/628.1, 657.1, 156/659.11, 662.1; 216/2, 41, 55, 99; 73/517 R; 437/927

[56] References Cited

U.S. PATENT DOCUMENTS 4,744,863  5/1988  Guckel et al. ................. 156/657.1 X
5,332,469  7/1994  Motamedi ....................... 156/657.1

*Primary Examiner*—William Powell
*Attorney, Agent, or Firm*—Irving Keschner

[57] ABSTRACT

A method for fabricating an 8-beam bridge-type silicon acceleration sensor comprises the steps of: growing a silicon oxide layer on the top surface of the silicon substrate; forming an $n^+$ diffusion region in the substrate by successively performing the process of opening a diffusion window in the silicon oxide layer, implanting $n^+$ impurities in the silicon substrate through the diffusion window, and evenly diffusing the $n^+$ impurities into the substrate; removing the silicon oxide layer, and then growing an epitaxial layer thereon; forming a plurality of piezo-resistors in the epitaxial layer by successively performing the process of growing an oxide layer on the epitaxial layer, implanting impurities, and then evenly diffusing the impurities; removing the silicon oxide layer; forming a porous silicon layer from the $n^+$ diffusion region by performing an anodic reaction in HF solution; loading a mass on the epitaxial layer; and, forming an air-gap in the substrate by etching the porous silicon layer.

2 Claims, 4 Drawing Sheets

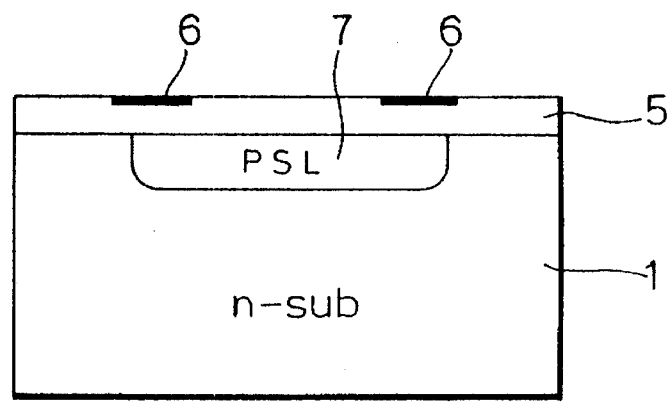
FIG. ID
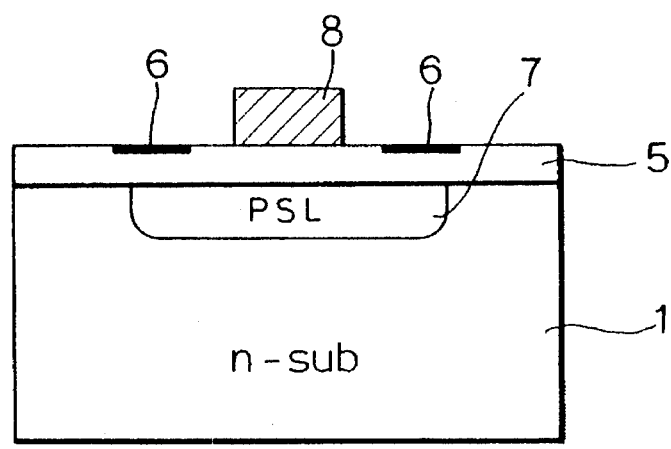
FIG. IE
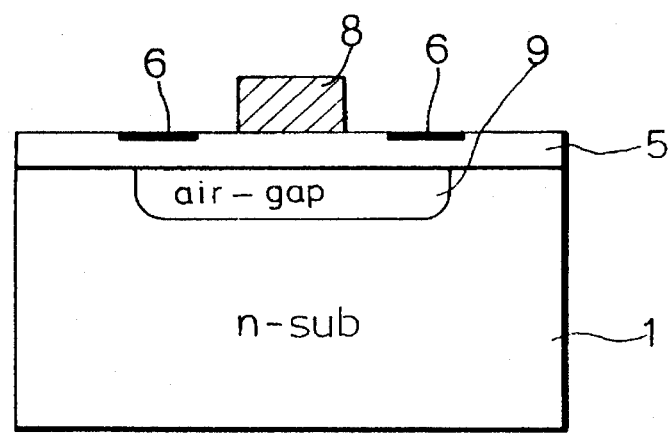
FIG. IF

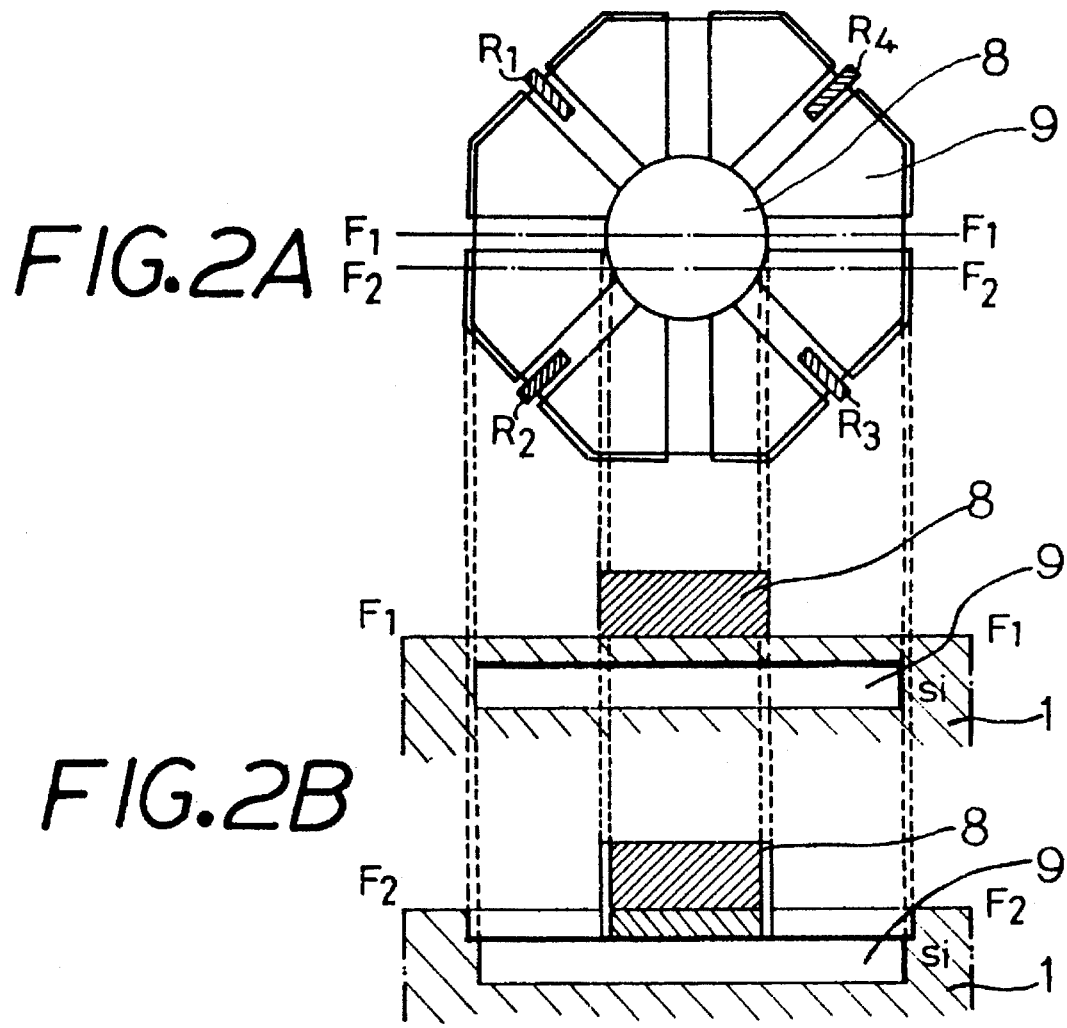

8-BEAM BRIDGE-TYPE SILICON ACCELERATION SENSOR AND THE FABRICATING METHOD THEREOF

BACKGROUND OF THE INVENTION

1. Field of the Invention

The present invention relates to a silicon acceleration sensor and the fabricating method thereof, and particularly to a bridge-type silicon acceleration sensor having eight beams and the fabricating method thereof.

2. Description of the Prior Art

A silicon sensor, which senses acceleration, vibration or the like, is basically classified into two types based on the mechanical structure mounting a mass thereon: a cantilever-type and a bridge-type. Currently, a bridge-type acceleration sensor having two or four beams, that is, a bridge-type acceleration sensor supporting the mass thereof by two or four beams, is well known to a person in the art. However, a bridge-type acceleration sensor supporting the mass thereof at eight directions (hereinafter, called as an 8-beam bridge-type acceleration sensor) has been not introduced up to now because of the difficulty in precisely shaping the microstructure when a silicon substrate is etched by a conventional isotropic etching process.

Furthermore, the 8-beam bridge-type acceleration sensor has been not taken into consideration till now because the sensitivity thereof is nothing but 25% as compared with a two-beam bridge-type acceleration sensor.

On the other hand, a S/N ratio (signal to noise ratio) is the most important thing in the art of the silicon acceleration sensor, which is determined by directional selectivity. Because the conventional cantilever-type or bridge-type acceleration sensor has poor directional selectivity, additional stoppers for preventing the mass portion from being vibrated or accelerated toward undesirable directions, for example, the left and/or right directions, should be provided in the vicinity of the mass portion.

As a result, a precise and complicated process is required due to the provision of the stoppers, and there occurs another problem such as shock noise and abrasion between the mass portion and the stoppers.

To solve the problems of the conventional acceleration sensor, the inventer has devised an 8-beam bridge-type acceleration sensor using a microstructure fabrication method incorporating a porous silicon which has been being lively studied in recent.

SUMMERY OF THE INVENTION

It is an object of the present invention to provide an 8-beam bridge-type acceleration sensor in which directional selectivity is excellent, mechanical strength is improved due to smaller shear stress, and the operation state may be monitored.

To achieve the afore-mentioned object, a method for fabricating a bridge-type silicon acceleration sensor with eight beams comprises the steps of: growing a silicon oxide layer on the top surface of the silicon substrate; forming an $n^+$ diffusion region in the substrate by successively performing the process of opening a diffusion window in the silicon oxide layer, implanting $n^+$ impurities in the silicon substrate through the diffusion window, and evenly diffusing the $n^+$ impurities into the substrate; removing the silicon oxide layer, and then growing an epitaxial layer thereon; forming a plurality of piezo-resistors in the epitaxial layer by successively performing the process of growing a silicon oxide layer on the epitaxial layer, implanting impurities, and then evenly diffusing the impurities; removing the silicon oxide layer; forming a porous silicon layer from the $n^+$ diffusion region by performing an anodic reaction in HF solution; loading a mass on the epitaxial layer; and, forming an air-gap in the substrate by etching the porous silicon layer.

BRIEF DESCRIPTION OF THE ACCOMPANYING DRAWINGS

These and other aspects of the present invention are clarified in the accompanying drawings in which:

FIGS. 1(A) through (F) are cross sectional views showing a fabricating process of an 8-beam bridge-type acceleration sensor according to the present invention;

FIGS. 2(A) through (C) are top plane and cross sectional views of a part including the mass of an 8-beam bridge-type acceleration sensor according to the present invention, respectively; and, FIGS. 3(A) and (B) are photographs of the microstructure of an 8-beam bridge-type acceleration sensor with the mass unloaded, taken by a scanning electron microscope.

DETAILED DESCRIPTION OF THE PREFERRED EMBODIMENT

For a better understanding of the present invention, together with other and further objects, advantages and capabilities thereof, reference is made to the following disclosure and appended claims in connection with the above described drawings.

Figure 1A:
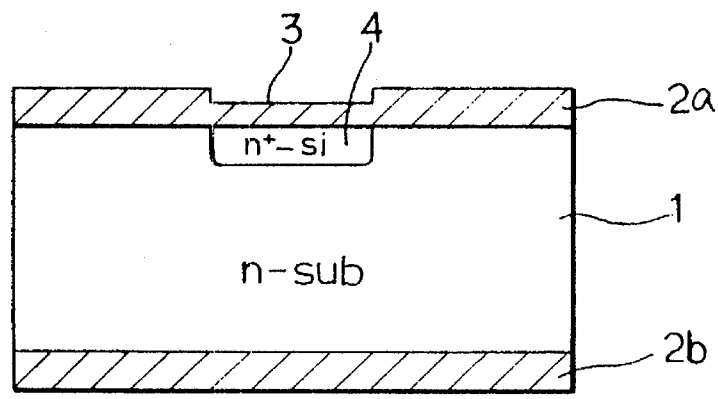

Referring to FIG. 1(A), a silicon substrate 1 is cleaned, and then a silicon oxide layer 2a is grown on the top surface of the silicon substrate 1. Next, a diffusion window 3 is opened in the silicon oxide layer 2a of the substrate 1 by photolithographic technique, and $n^+$ impurities are implanted and evenly diffused into the substrate 1 through the diffusion window 3 to form a $n^+$ diffusion region 4. In FIG. 1(A), the silicon oxide layer 2b of the bottom surface of the silicon substrate 1 is formed simultaneously with the silicon oxide layer 2a. However, the silicon oxide layer 2b is not important to the construction of the present invention.

Figure 1B:
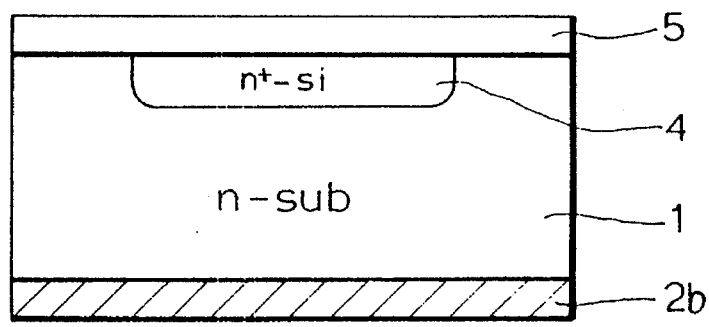

Referring to FIG. 1(B), the silicon oxide layer 2a of the substrate 1 is removed and then cleaned. Next, an epitaxial layer 5, for example an n-type epitaxial layer, is grown thereon.

Figure 1C:
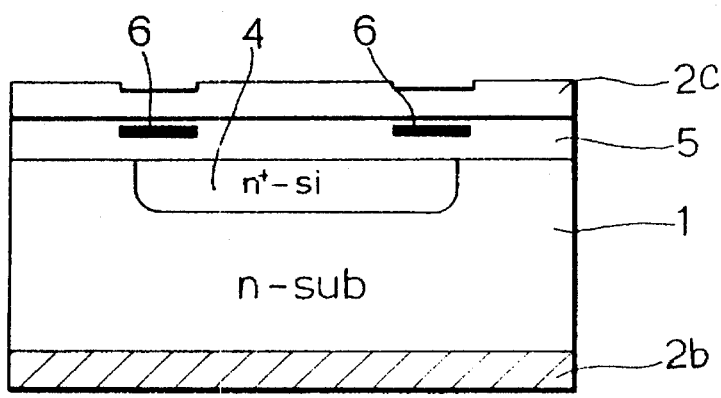

Referring to FIG. 1(C), a plurality of piezo-resistors 6 are formed in the epitaxial layer 5 by successively performing the process of growing an oxide layer 2c on the epitaxial layer 5, implanting impurities, and then evenly diffusing the impurities. The piezo-resistors 6 may be preferably formed of p-type impurities.

Referring to FIG. 1(D), the silicon oxide layers 2b and 2c are removed by an etching process. Next, a porous silicon layer 7 is made from the $n^+$-diffusion region 4 using an anodic reaction process.

Referring to FIG. 1(E), a mass is loaded on the epitaxial layer 5 by a mass loading technique such as an electroplating or dispensing.

Finally, an air-gap 9 is formed in the substrate 1 by etching the porous silicon layer 4 as shown in FIG. 1(F).

An 8-beam bridge-type silicon acceleration sensor is precisely fabricated by the method described above.

FIG. 2(A) is a top plane view of the parts including the mass 8 of an 8-beam bridge-type acceleration sensor according to the present invention, FIG. 2(B) is a cross sectional view taken along an F1—F1 line of FIG. 2(A), and FIG. 2(C) is a cross sectional view taken along an F2—F2 line of FIG. 2(A) respectively. In FIGS. 2(A) through (C), the reference numeral R1 through R4 denote the piezo-resistors, 1 denotes the silicon substrate, 8 denotes the mass, and 9 denotes the air-gap.

Figure 3A:
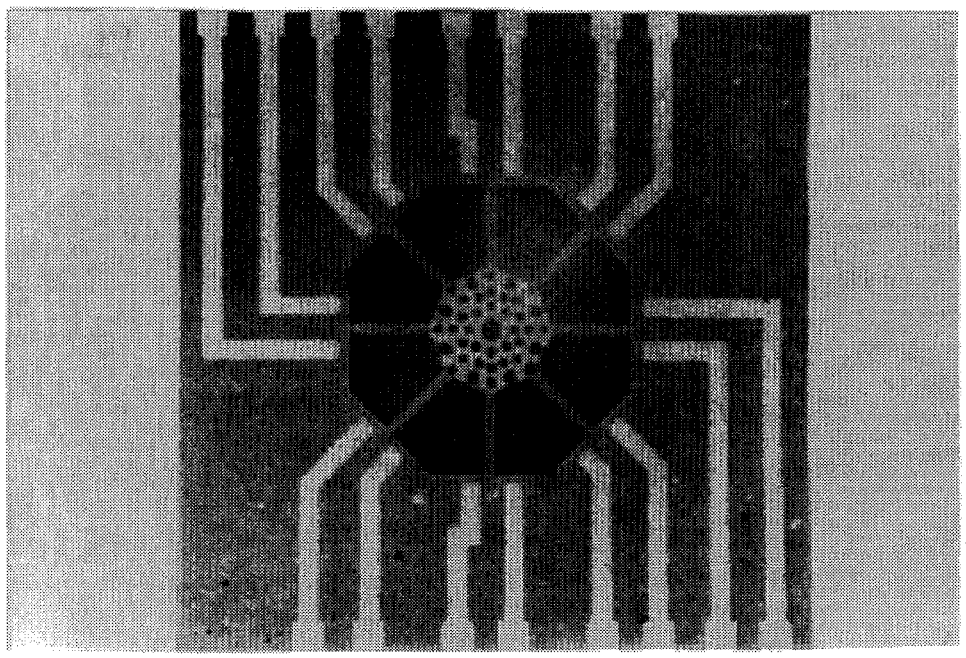
Figure 3B:
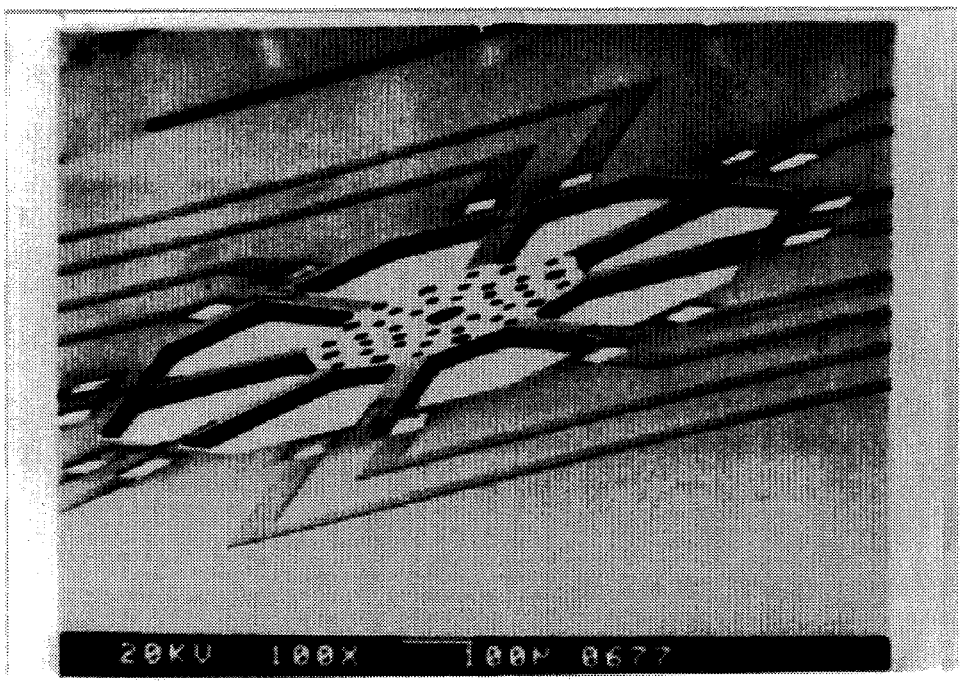

FIG. 3(A) is a photograph of the microstructure of an 8-beam bridge-type acceleration sensor with the mass unloaded, taken at an orthogonal angle by a scanning electron microscope, and FIG. 3(B) is a photograph of the microstructure of FIG. 3(A), taken at an angle of declination.

According to the 8-beam bridge-type silicon acceleration sensor, the sensor is fabricated with ease and precision, and the mechanical strength of the acceleration sensor is improved because of the number of beams which supports the microstructure for loading the mass. Furthermore, it is possible to endow a function of determining whether or not the acceleration sensor is in normal operation by comparing the resistance generated at the respective piezo-resistor with each other.

We claim:

1. A method for fabricating a bridge-type silicon acceleration sensor having eight beams, the method comprising the steps of:

growing a silicon oxide layer on the top surface of the silicon substrate;

forming an $n^+$ diffusion region in the substrate by successively performing the process of opening a diffusion window in the silicon oxide layer, implanting $n^+$ impurities in the silicon substrate through the diffusion window, and evenly diffusing the $n^+$ impurities into the substrate;

removing the silicon oxide layer, and then growing an epitaxial layer thereon;

forming a plurality of piezo-resistors in the epitaxial layer by successively performing the process of growing an oxide layer on the epitaxial layer, implanting impurities, and then evenly diffusing the impurities;

removing the silicon oxide layer;

forming a porous silicon layer from the $n^+$-diffusion region by performing an anodic reaction in HF solution;

loading a mass on the epitaxial layer; and, forming an air-gap in the substrate by etching the porous silicon layer.

2. A bridge-type silicon acceleration sensor having eight beams fabricated by the method of claim 1.

* * * * *